US012682423B2

(12) United States Patent
Yoo et al.

(10) Patent No.: US 12,682,423 B2
(45) Date of Patent: Jul. 14, 2026

(54) METHOD AND APPARATUS WITH IMAGE RESTORATION

(71) Applicant: SAMSUNG ELECTRONICS CO., LTD., Suwon-si (KR)

(72) Inventors: Jaehyoung Yoo, Suwon-si (KR); Kinam Kwon, Suwon-si (KR); Junsang Yu, Suwon-si (KR); Hyong Euk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 492 days.

(21) Appl. No.: 18/091,239

(22) Filed: Dec. 29, 2022

(65) Prior Publication Data

US 2024/0020808 A1 Jan. 18, 2024

(30) Foreign Application Priority Data

Jul. 14, 2022 (KR) ........................ 10-2022-0087068

(51) Int. Cl.
*G06T 5/50* (2006.01)
*G06T 5/20* (2006.01)

(52) U.S. Cl.
CPC ................. *G06T 5/50* (2013.01); *G06T 5/20* (2013.01); *G06T 2207/20024* (2013.01); *G06T 2207/20084* (2013.01); *G06T 2207/20224* (2013.01)

(58) Field of Classification Search
None
See application file for complete search history.

(56) References Cited

U.S. PATENT DOCUMENTS

| | | | |
|---|---|---|---|
| 11,151,702 B1 | 10/2021 | Tico et al. | |
| 2017/0140526 A1* | 5/2017 | Chen ..................... | G06Q 30/018 |
| 2020/0302265 A1* | 9/2020 | Wang ................... | G06V 10/454 |
| 2021/0019602 A1* | 1/2021 | Yang ..................... | G06N 3/047 |
| 2021/0150674 A1 | 5/2021 | Cai et al. | |
| 2021/0239618 A1* | 8/2021 | Cheng ................... | G01N 21/65 |

(Continued)

FOREIGN PATENT DOCUMENTS

| | | |
|---|---|---|
| KR | 10-2019-0062203 A | 6/2019 |
| KR | 10-2020-0025889 A | 3/2020 |
| KR | 10-2021-0141303 A | 11/2021 |

(Continued)

OTHER PUBLICATIONS

He, Jingwen, et al., "Interactive Multi-Dimension Modulation with Dynamic Controllable Residual Learning for Image Restoration.", arXiv:1912.05293v2, 2019.*

(Continued)

*Primary Examiner* — Jiangeng Sun
(74) *Attorney, Agent, or Firm* — NSIP Law

(57) ABSTRACT

An image restoration method and apparatus are provided. The image restoration method includes determining auxiliary data corresponding to a plurality of filter kernels by filtering target data with the plurality of filter kernels, determining new input data by combining the auxiliary data with at least some input data of layers of a neural network-based image restoration model, generating, based on the new input data, a restored image of the input image by executing the neural network-based image restoration model, wherein the filter kernels are not part of the neural network-based image restoration model.

18 Claims, 13 Drawing Sheets

(56) References Cited

U.S. PATENT DOCUMENTS

2023/0036338 A1\* 2/2023 Liu ........................ G06V 10/82

FOREIGN PATENT DOCUMENTS

WO      WO-2018171899 A1 \*  9/2018      ........... G06N 3/0454
WO      WO 2020/116923 A1    6/2020
WO      WO-2023102868 A1 \*  6/2023      ........... G06N 3/0455

OTHER PUBLICATIONS

Zhang, Kai, et al. "Beyond a gaussian denoiser: Residual learning of deep cnn for image denoising." *IEEE transactions on image processing* 26.7 (2017): 3142-3155.
Lim, Bee, et al. "Enhanced deep residual networks for single image super-resolution." *Proceedings of the IEEE conference on computer vision and pattern recognition workshops*. 2017.
He, Jingwen, et al., "Interactive Multi-Dimension Modulation with Dynamic Controllable Residual Learning for Image Restoration." Computer Vision—ECCV 2020: 16th European Conference, Glasgow, UK, Aug. 23-28, 2020, Proceedings, Part XX 16. Springer International Publishing, 2020., (16 pages).
Extended European search report issued on Dec. 15, 2023, in counterpart European Patent Application No. 23171043.5 (10 pages).

\* cited by examiner

METHOD AND APPARATUS WITH IMAGE RESTORATION

CROSS-REFERENCE TO RELATED APPLICATIONS

This application claims the benefit under 35 USC § 119(a) of Korean Patent Application No. 10-2022-0087068, filed on Jul. 14, 2022, in the Korean Intellectual Property Office, the entire disclosure of which is incorporated herein by reference for all purposes.

BACKGROUND

1. Field

The following description relates to a method and apparatus with image restoration.

2. Description of Related Art

Image restoration may involve restoring an image of degraded quality to an image of improved quality. Image restoration may be performed by a deep learning-based neural network. The neural network may be trained based on deep learning and may perform inference for a desired purpose by mapping input data and output data that are in a nonlinear relationship to each other. Such a trained capability of generating the mapping may be referred to as a learning ability of the neural network. The neural network trained for a special purpose, such as image restoration, may have a general ability to generate a relatively accurate output in response to an input pattern that is not yet trained.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an image restoration method includes determining auxiliary data corresponding to a plurality of filter kernels by filtering target data with the plurality of filter kernels, determining new input data by combining the auxiliary data with at least some input data of layers of a neural network-based image restoration model, and generating, based on the new input data, a restored image of an input image by executing the neural network-based image restoration model, wherein the filter kernels are not part of the neural network-based image restoration model.

The target data may include at least some of the input image, the at least some input data of the layers, or at least some output data of the plurality of layers.

The determining the auxiliary data may include determining first auxiliary data by filtering the target data with a first filter kernel of the plurality of filter kernels, and determining second auxiliary data by filtering the target data with a second filter kernel of the plurality of filter kernels.

The determining the new input data may include determining new first input data by combining the first auxiliary data with first input data of a first layer of the layers of the neural network-based image restoration model, and determining new second input data by combining the second auxiliary data with second input data of a second layer of the layers of the neural network-based image restoration model.

The first filter kernel and the second filter kernel may correspond to a Gaussian filter, the second layer may be closer to an output layer of the neural network-based image restoration model than the first layer, and a size of the second filter kernel may be greater than a size of the first filter kernel.

The determining the new input data may include determining new first input data by combining the first auxiliary data and the second auxiliary data with first input data of a first layer of the layers of the neural network-based image restoration model.

The determining the first auxiliary data and the determining the second auxiliary data may be performed in parallel with respect to each other.

The target data may be the input image, the determining the auxiliary data may include selecting the plurality of filter kernels according to respective having different filter parameters thereof, and determining the auxiliary data based on filtering results corresponding to the plurality of filter kernels by filtering the input image in parallel by the plurality of filter kernels, and the generating the restored image may include generating, based on the new input data according to the auxiliary data, the restored image by sequentially executing the plurality of layers of the neural network-based image restoration model.

The plurality of filter kernels may include a first filter kernel corresponding to a Gaussian filter for a first layer of the layers, the determining the auxiliary data may include generating a first filtering result by filtering the target data with the first filter kernel, and determining first auxiliary data corresponding to a difference between the target data and the first filtering result, and the determining the new input data may include determining new first input data by concatenating first input data of the first layer with the first auxiliary data.

The generating the restored image may include generating the restored image based on a difference between an output image of the neural network-based image restoration model and the input image.

At some of the determining the auxiliary data and the determining the new input data may be performed through image signal processing (ISP) of a sensor that captures the input image, and the rest of the determining the auxiliary data and the determining the new input data may be performed through ISP of an application processor (AP).

In one general aspect, an electronic device includes a camera configured to generate an input image, one or more processors, storage hardware storing instructions configured to, when executed by the one or more processors, cause the one or more processors to: receive the input image, determine auxiliary data corresponding to a plurality of filter kernels by filtering target data with the plurality of filter kernels, determine new input data by combining the auxiliary data with at least some input data of layers of a neural network-based image restoration model, and generate a restored image of the input image by executing the neural network-based image restoration model based on the new input data.

The target data may include at least some of the input image, the at least some input data of the plurality of layers, or at least some output data of the plurality of layers.

The instructions may be further configured to cause the one or more processors, to determine the auxiliary data: determine first auxiliary data by filtering the target data with a first filter kernel of the plurality of filter kernels, and determine second auxiliary data by filtering the target data with a second filter kernel of the plurality of filter kernels.

The instructions may be further configured to cause the one or more processors, to determine the new input data: determine new first input data by integrating the first auxiliary data with first input data of a first layer corresponding to any one of the plurality of layers of the neural network-based image restoration model, and determine new second input data by integrating the second auxiliary data with second input data of a second layer corresponding to another one of the plurality of layers of the neural network-based image restoration model.

The instructions may be further configured to cause the one or more processors, to determine the new input data: determine new first input data by combining the first auxiliary data and the second auxiliary data with first input data of a first layer corresponding to any one of the plurality of layers of the neural network-based image restoration model.

The instructions may be further configured to cause the one or more processors to determine the first auxiliary data and the second auxiliary data in parallel.

In one general aspect, a method includes processing an input image with an image restoration model may further include a convolutional neural network (CNN) that includes a first convolution layer and a second convolution layer, the processing including the first convolution layer generating a first feature map as an output thereof, filtering the input image with a filter kernel that may be not part of the restoration model to generate a first filtered image, wherein the processing the image with the restoration model includes providing both the first feature map and the first filtered image as part of an input volume inputted to the second convolution layer, and generating a restored image corresponding to the input image based on an output of the second convolution layer processing the input volume.

The generating the restored image may include finding a difference between an output of the CNN and the input image, and wherein the output of the CNN may be based on the output of the second convolution layer.

Providing the first filtered image may increase a number of channels that may be input to the second convolution layer.

Other features and aspects will be apparent from the following detailed description, the drawings, and the claims.

Figure 1:
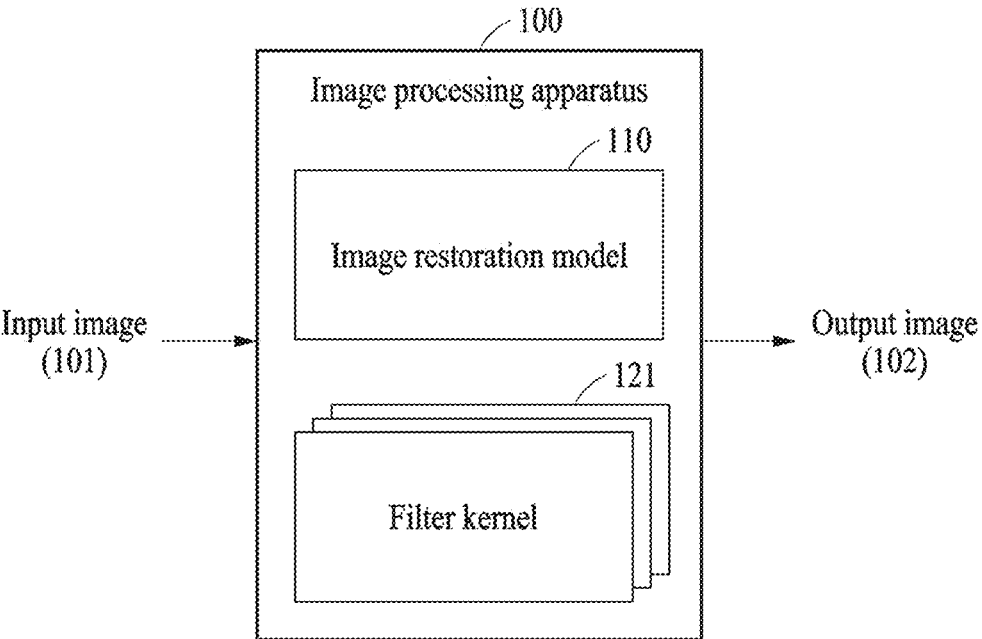
FIG. 1 illustrates an example image processing apparatus using an image restoration model and a filter kernel, according to one or more embodiments.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

FIG. 1 illustrates an example an image processing apparatus using an image restoration model and a filter kernel. Referring to FIG. 1, an image processing apparatus 100 may generate a restored image 102 corresponding to an input image 101. The input image 101 may include a degradation element. For example, the degradation element may include noise, blur, and the like. The degradation element may occur in an image capturing pipeline, such as during capturing light by a photodiode of an image sensor, during transforming an analog signal into a digital signal, during quantization, and/or the like. The restored image 102 may be a result of improving the input image by removing a degradation element from the input image 101.

Various filters, which are designed based on typical signal processing theories, may be used to remove a degradation element. The degradation element may be removed by applying a filter to an image (or a feature map therefrom) through an operation such as a convolution operation. Typical signal processing-based filters may provide a software and/or hardware implementation that may be accelerated. However, in real-world applications, the typical signal processing-based filters may have a threshold on performance.

Removing noise by using a deep neural network (DNN) may perform better than using signal-processing filters. For example, a DNN based on a convolutional neural network (CNN) may perform a convolution operation on an input feature of each layer and a kernel thereof to extract an input feature of the next layer, and a CNN model may be configured by stacking convolution layers.

The DNN may perform better than signal processing-based filters, but with greater memory and computation time. A CNN having a cascade structure may not be parallelized, and operation time may dramatically (e.g., exponentially) increase as the number of layers increases. Accordingly, the DNN may not be practical for low-power or real-time applications.

The image processing apparatus 100 may generate the restored image 102 corresponding to the input image 101 by using an image restoration model 110 and a filter kernel 121. The image restoration model 110 may include a neural network model. A neural network model may be a DNN that includes a plurality of layers. The plurality of layers may include an input layer, at least one hidden layer, and an output layer. The hidden layer may be also referred to as an intermediate layer, and the output layer may be also referred to as a final layer.

The DNN may be a fully connected network (FCN), a CNN, and a recurrent neural network (RNN), or other suitable type of neural network, or combinations thereof. For example, at least some of the plurality of layers in the neural network may correspond to a CNN and the others may correspond to an FCN. In this case, the CNN portion of the DNN may be referred to as convolutional layers and the FCN portion of the DNN may be referred to as fully connected layers.

In the CNN, data input to a given layer may be referred to as an input feature map and data output from a given layer may be referred to as an output feature map (in practice, there may be multiple channels/feature maps exchanged between two layers). An output feature map of one layer may be the input feature map of the next layer. The input feature maps and output feature maps may be referred to as feature representations or activation data. The input feature map of the input layer may be an input image.

The neural network may be trained based on deep learning to perform inference suitable for a training purpose by mapping input data and output data that are in a nonlinear relationship to each other. The deep learning may be a machine learning technique for applications such as image or speech recognition, from a big data set. The deep learning may be a process of solving an optimization issue to find a point at which energy is minimized while training a neural network by using prepared training data.

Through supervised or unsupervised deep learning, weights corresponding to an architecture or model of the neural network may be obtained. Through the weights, the input data and the output data may be mapped to each other. For example, when the width and depth of the neural network are sufficiently large, the neural network may have sufficient capacity to implement an arbitrary function. When the neural network is trained on a sufficiently large quantity of training data through an appropriate training process, an optimal performance may be achieved.

The neural network may be expressed as being trained in advance, in which "in advance" means "before" the neural network is started. The "started" neural network may indicate that the neural network may be ready for inference. For example, "start" of the neural network may include loading of the neural network in a memory, or an input of input data for inference to the neural network after the neural network is loaded in a memory.

The filter kernel 121 may be a typical signal processing-based filter (e.g., an image-processing filter). For example, the filter kernel 121 may be a Gaussian filter, a median filter, a Sobel filter, and/or the like. However, the foregoing examples are merely examples, and the filter kernel 121 may be other types of filters. There may be multiple filter kernels 121. The filter kernel(s) 121 may not be kernels of neural network layers, e.g., the filter kernel(s) may not be used as CNN kernels. That is, the filter kernels are to be distinguished from kernels of any convolution layers of a neural network. For example, the filter kernels may not include trained/learned weights (or at least values of the filter kernels may not be learned within the context of the image processing apparatus 100 or the images that it is restoring). In other words, the filter kernel(s) 121 may be kernels typically used in digital signal processing of images and may be convolved over padded input data so that a filter kernel's output data has a same dimension as its input data.

The filter kernels 121 may be identified through respective filter parameter. For example, a filter parameter may include the type and characteristics of an associated filter. The identified characteristics of the filter may include a filtering factor, the size of the filter, and/or the like. For example, the filter type may be a Gaussian filter, the filtering factor may be $\sigma$ and $\mu$, and the size of the filter may be w*h. The $\sigma$ factor may be a standard deviation, the $\mu$ factor may be an average, w may be a width, and h may be a height. As noted, the image processing apparatus 100 may use a plurality of filter kernels, including the filter kernel 121, for image restoration. The number of filter kernels may be the same as the number of layers of the image restoration model 110. Alternatively, the number of filter kernels may be greater or less than the number of layers of the image restoration model 110.

The image processing apparatus 100 may substantially reduce an operation quantity and memory needed for image restoration by decreasing the number of layers of the image restoration model 110 and by supplementing the image restoration model 110 with the filter kernel 121 that is based on signal processing. The image processing apparatus 100, despite using a DNN with less layers than a typical DNN (which is implemented without a limit on the number of layers) may provide better or at least similar image restoration performance than a typical DNN. In addition, the DNN with less layers may enable faster image restoration with less memory than the typical DNN. Accordingly, the image processing apparatus 100 may be applied to low-power or real-time applications, for example.

Figure 2:
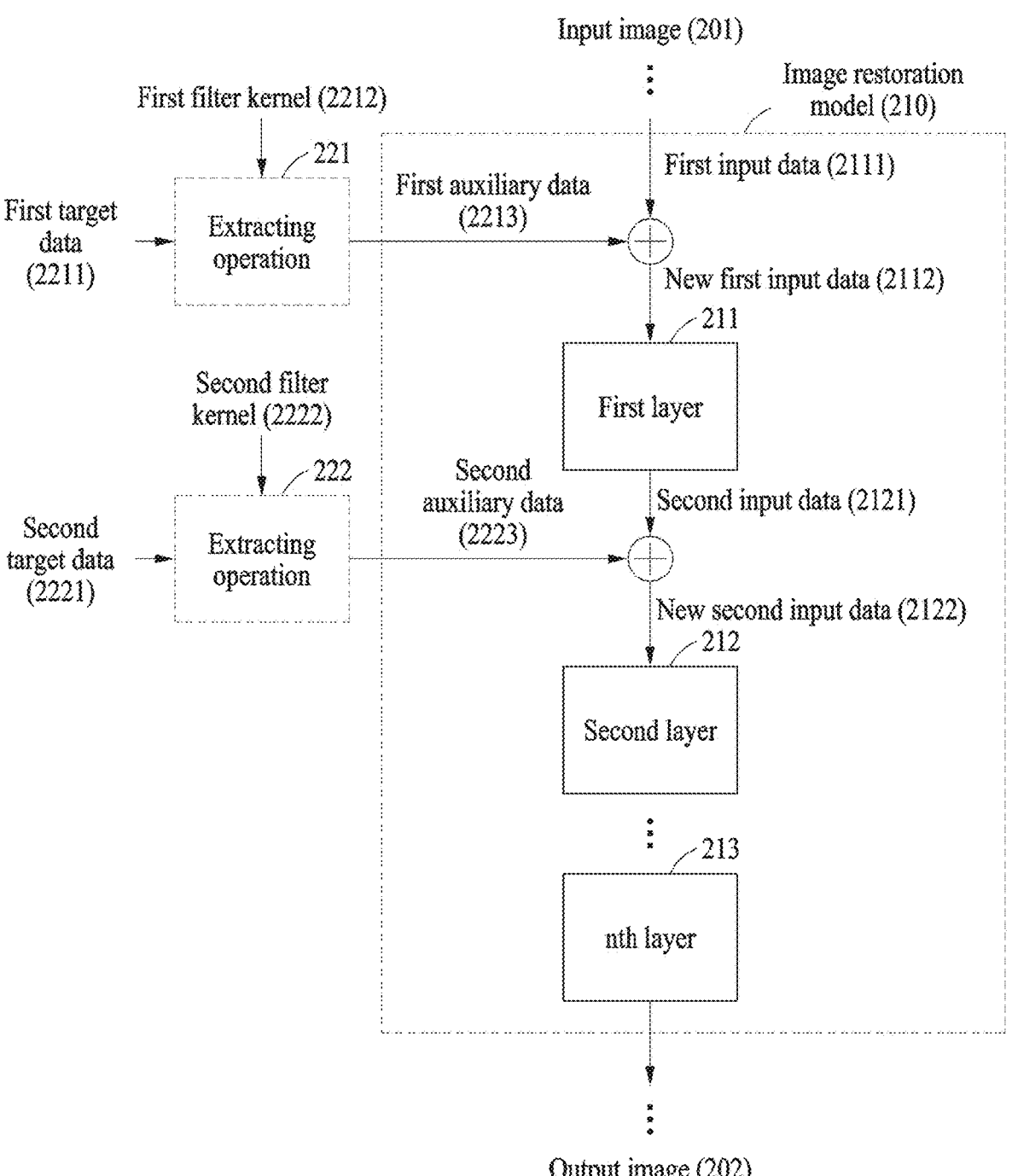
FIG. 2 illustrates an example of an extracting operation based on a filter kernel and a network operation of an image restoration model, according to one or more embodiments.

FIG. 2 illustrates an example of an extracting operation based on a filter kernel and a network operation of an image restoration model. Referring to FIG. 2, an image restoration model 210 may include first, second, and nth layers 211, 212, and 213 (i.e., two or more layers). An image processing apparatus may execute the image restoration model 210 and generate an output image 202 corresponding to an input image 201. The image processing apparatus may extract first and second auxiliary data 2213 and 2223 respectively from first and second target data 2211 and 2221 by using first and second filter kernels 2212 and 2222 and may transform at least some of first and second input data 2111 and 2121 of the first, second, and nth layers 211, 212, and 213 by respectively using the first and second auxiliary data 2213 and 2223. The first and second target data 2211 and 2221 may include at least some of the input image 201, the first and second input data 2111 and 2121, and new first input data 2112. Although not illustrated in FIG. 2, the image restoration model 210 may further include a connection (e.g., a skip connection) for summing the input image 201 and the output image 202. In this case, a summing result may correspond to a final output of the image restoration model 210.

More specifically, the image processing apparatus may perform an extracting operation 221, based on the first target data 2211 and the first filter kernel 2212. The first target data 2211 may include at least some of the input image 201 and the first input data 2111. The extracting operation 221 may include a filtering operation by using the first filter kernel 2212. For example, the filtering operation may include convolving the first filter kernel 2212 over first target data 2211. The image processing apparatus may filter the first target data 2211 with the first filter kernel 2212 and generate a first filtering result. If a second (or more) extracting operation 222 is included, the second extracting operation 222 may be performed in a like manner.

The first auxiliary data 2213 may be the first filtering result or a result of an additional operation between the first target data 2211 and the first filtering result. For example, the first auxiliary data 2213 may be a difference between the first target data 2211 and the first filtering result. For example, when the first filter kernel 2212 is a low pass filter (LPF) (e.g., a Gaussian LPF), the first filtering result may correspond to a low-frequency element of the first target data 2211 and the additional operation result (the first auxiliary data 2213) may correspond to a high-frequency element of the first target data 2211.

The image processing apparatus may fuse (e.g., combine) the first auxiliary data 2213 with the first input data 2111 to determine the new first input data 2112. For example, fusion may be performed through concatenation or other methods of combining (concatenation may involve adding the auxiliary data as an additional feature map or image to be inputted to a network layer of an image, e.g., as an additional part of an input volume). The first auxiliary data 2213 may be merged into an additional channel of the first input data 2111 through concatenation in a channel dimension and may serve as a basis for determining the new first input data 2112. Without the fusion, the same as the first input data 2111 serves as the new first input data 2112 (i.e., the first input data 2111 is input to the first layer 211).

The image processing apparatus may execute the first layer 211 to generate the second input data 2121 as an output of the first layer 211. Executing the image restoration model 210 or the first, second, and/or nth layers 211, 212, and 213 may be involve processing a network operation related to the image restoration model 210 or the first, second, and/or nth layers 211, 212, and 213. For example, any layer of the first, second, and/or nth layers 211, 212, and 213 may be a convolutional layer, and the image processing apparatus may perform a convolution operation between the layer and a weight kernel of the layer and determine an output of the layer. Alternatively, when the layer further requires an activation operation (e.g., a rectified linear unit (ReLu)) in addition to the convolution operation, the image processing apparatus may perform the activation operation on a convolution operation result to generate an output of the layer.

The image processing apparatus may process the second layer 212 responsive to an operation on the first layer 211. The image processing apparatus may determine the second auxiliary data 2223 through an extracting operation 222 based on the second target data 2221 and the second filter kernel 2222 and determine new second input data 2122 by fusing the second auxiliary data 2223 with the second input data 2121. For example, the extracting operation 222 may use input data of the first layer 211 and/or output data of the first layer 211 as the second target data 2221. In this case, the input data of the first layer 211 may be the new first input data 2112 and the output data of the first layer 211 may be the second input data 2121. The image processing apparatus may execute the second layer 212 with the new second input data 2122. The extracting and fusing of the first and second auxiliary data 2213 and 2223 may be further performed on several subsequent layers, such as the nth layer 213, and accordingly, the output image 202 may be determined.

When the first and second target data 2211 and 2221 correspond to the input image 201, the first and second auxiliary data 2213 and 2223 may be generated in parallel. In this case, a hardware configuration for generating the first and second auxiliary data 2213 and 2223 in parallel may be provided. The hardware configuration may serve as an accelerator for generating the first and second auxiliary data 2213 and 2223 in parallel, and accordingly, an image restoration time may decrease. A structure of deriving auxiliary data by using the first and second filter kernels 2212 and 2222 may not correspond to a DNN's cascade structure. Therefore, when the input image 201 is the first and second target data 2211 and 2221, a process of generating the first and second auxiliary data 2213 and 2223 may be parallelized (the input image 201 being available at the onset). For example, the first and second auxiliary data 2213 and 2223 may be completely prepared before or at the beginning of executing the image restoration model 210. Because the generation of the first and second auxiliary data 2213 and 2223 may not delay the execution of the image restoration model 210, a time of deriving the output image 202 may decrease.

Figure 3:
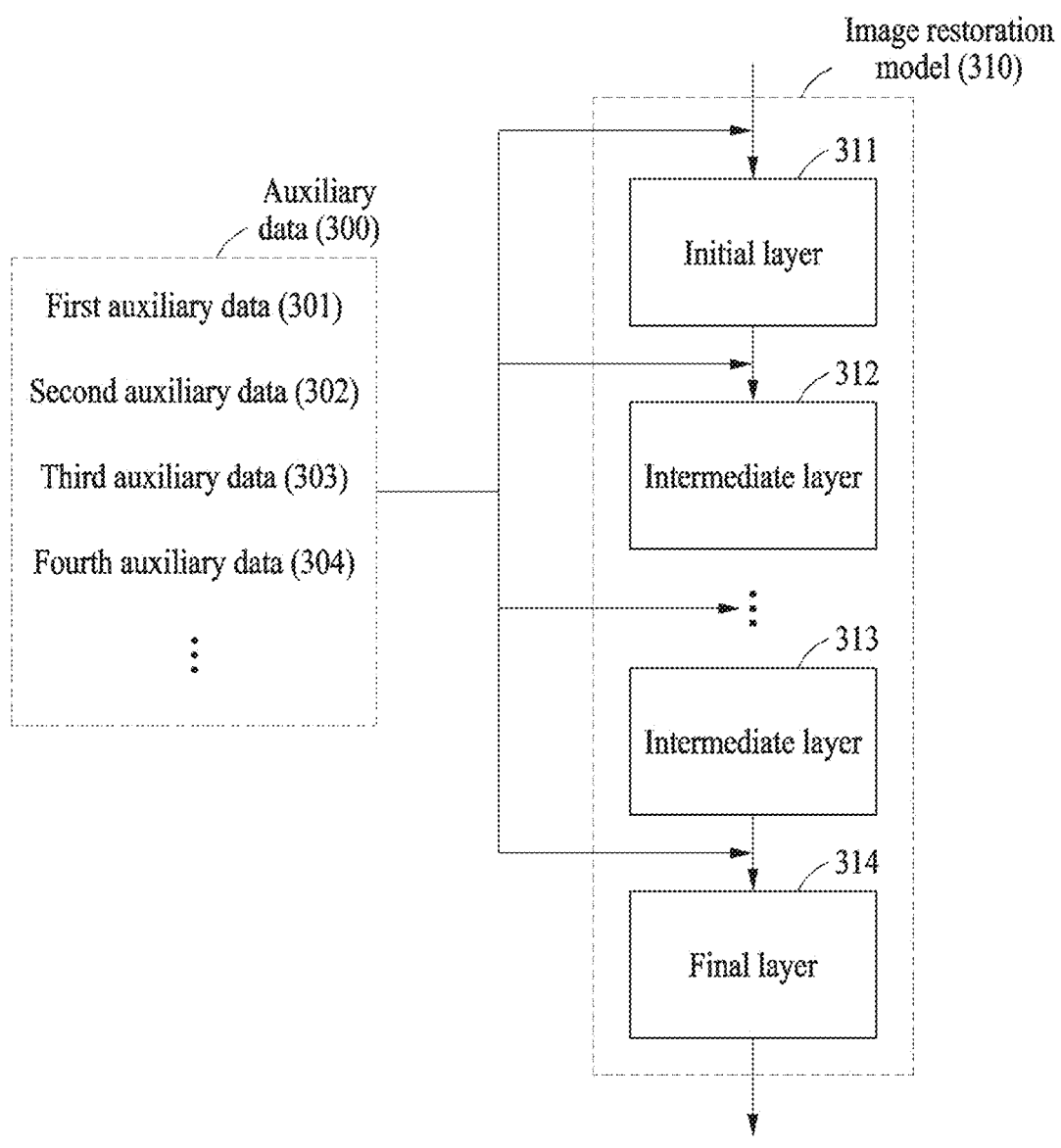
FIG. 3 illustrates examples of a fusion pattern of auxiliary data, according to one or more embodiments.

FIG. 3 illustrates examples of a fusion pattern of auxiliary data. FIG. 2 illustrates an example of applying the first and second auxiliary data 2213 and 2223 respectively to the first and second layers 211 and 212. Referring to FIG. 3, auxiliary data 300 may fuse (e.g., join, combine), in various patterns, with various positions of an image restoration model 310. The auxiliary data 300 may include a plurality of first, second, third, and fourth auxiliary data 301, 302, 303, and 304. The first, second, third, and fourth auxiliary data 301, 302, 303, and 304 may be generated by using respective different filter kernels, or at least some of the first, second, third, and fourth auxiliary data 301, 302, 303, and 304 may be generated by using the same filter kernel. When using different filter kernels, the number of filter kernels may be the same as the number of pieces of the first, second, third, and fourth auxiliary data 301, 302, 303, and 304. The first, second, third, and fourth auxiliary data 301, 302, 303, and 304 may be respectively input to at least some of inputs of initial, intermediate, intermediate, and final layers 311, 312, 313, and 314. Accordingly, there may be various fusion patterns. For example, each of the first, second, third, and fourth auxiliary data 301, 302, 303, and 304 may be evenly distributed and fused (combined, joined, etc.) into each input of the initial, intermediate, intermediate, and final layers 311, 312, 313, and 314, or two or more of first, second, third, and fourth auxiliary data 301, 302, 303, and 304 may be distributed and fused into a certain input thereof.

In an example, the auxiliary data 300 may include a same number of the auxiliary datum as the number of layers in the image restoration model 310. For example the auxiliary data 300 may include first, second, third, and fourth auxiliary data 301, 302, 303, and 304 and the image restoration model 310 may include initial, intermediate, intermediate, and final layers 311, 312, 313, and 314. In such example, the first, second, third, and fourth auxiliary data 301, 302, 303, and 304 may respectively fuse (e.g. join) with the initial, intermediate, intermediate, and final layers 311, 312, 313, and 314. An intermediate layer may correspond to a hidden layer, and a final layer may correspond to an output layer.

In another example, two or more of the first, second, third, and fourth auxiliary data 301, 302, 303, and 304, that is, a plurality of pieces of auxiliary data, may fuse with at least one input of any layer of the image restoration model 310. For example, the first auxiliary data 301 and the second auxiliary data 302 may fuse (combine or join) with an input of the initial layer 311, and the third auxiliary data 303 and the fourth auxiliary data 304 may fuse with an input of the final layer 314. In another example, the first, second, third, and fourth auxiliary data 301, 302, 303, and 304 may fuse with an input of the initial layer 311. There may be various other examples of a fusion point, other than the foregoing examples. A fusion pattern which is suitable for a current restoration task (e.g., noise removal, blur removal, image enhancement, etc.), may be adopted for a restoration process of the current restoration task. In other words, a fusion pattern may be any combination(s) of pieces of auxiliary data with fused with any input(s) of restoration model layers.

Figure 4A:
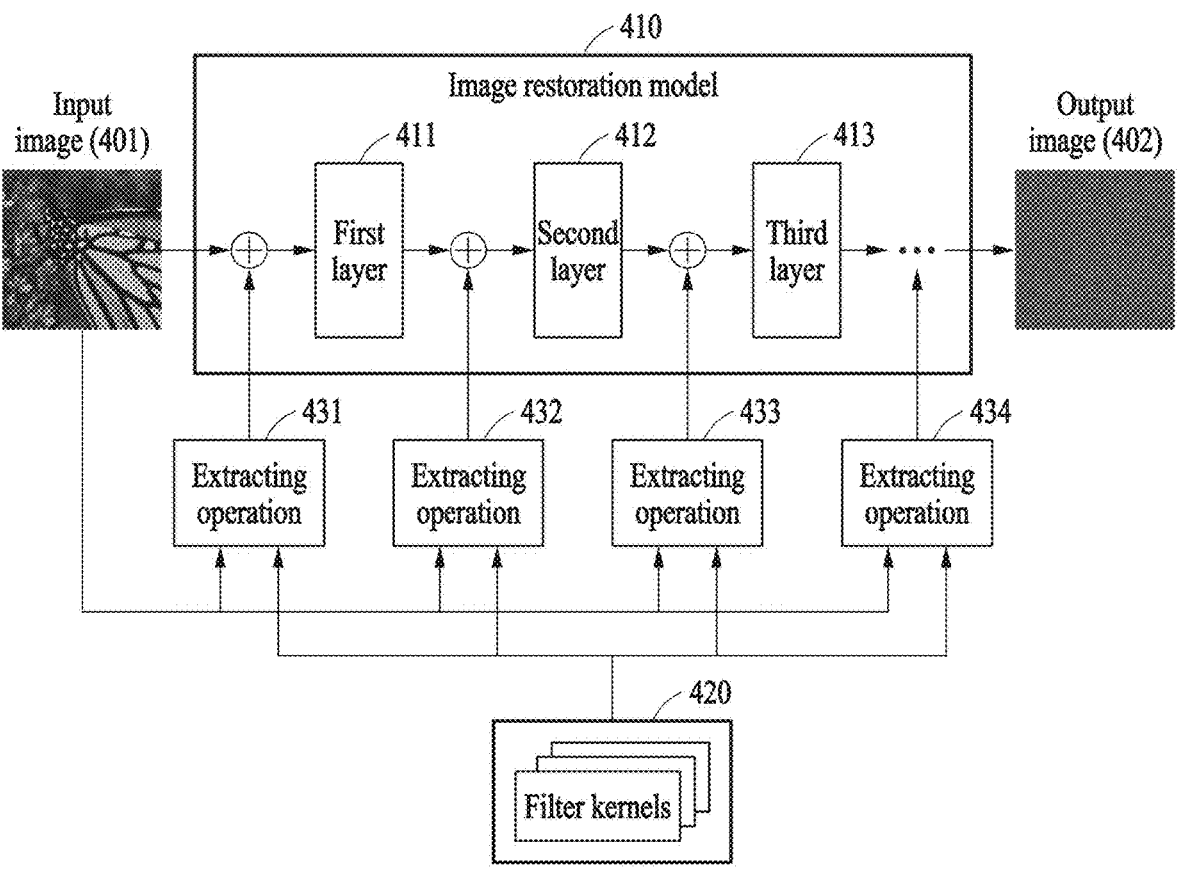
FIG. 4A illustrates an example of a network structure in which auxiliary data fuses with input data of an initial layer, an intermediate layer, and a final layer, according to one or more embodiments.

FIG. 4A illustrates an example of a network structure in which auxiliary data fuses with input data of an initial layer, an intermediate layer, and a final layer. Referring to FIG. 4A, an image processing apparatus may determine first auxiliary data, based on an extracting operation 431 between an input image 401 and a first filter kernel of filter kernels 420. For example, the image processing apparatus may determine a first filtering result by filtering the input image 401 through the first filter kernel and determine the first auxiliary data by subtracting the first filtering result from the input image 401. For example, the first filter kernel may correspond to an LPF (e.g., a Gaussian LPF), the first filtering result may correspond to a low-frequency element, and the first auxiliary data may correspond to a high-frequency element.

The image processing apparatus may determine new first input data by fusing the first auxiliary data with first input data of a first layer 411. When the first layer 411 is an initial layer, the first input data of the first layer 411 may be the input image 401. The image processing apparatus may concatenate the first auxiliary data with the first input data in a channel dimension. When the number of channels of the first input data is c1, the number of channels of the new first input data may be c1+1. The image processing apparatus may execute the first layer 411 by inputting the new first input data into the first layer 411. For example, the first layer 411 may be a convolutional layer.

The image processing apparatus may determine second auxiliary data by using the input image 401 and a second filter kernel of the filter kernels 420 (to generate second auxiliary data) and determine new second input data by fusing the second auxiliary data with second input data of a second layer 412; the new second input data is input to the second layer 412. The image processing apparatus may execute a third layer 413, based on third auxiliary data, which is determined through an extracting operation 433 and may additionally perform the foregoing operation on other filter kernels and other layers. The second layer 412 and the third layer 413 may each include a respective convolutional layer and an activation layer (as used herein "activation layer" may refer to an activation function). A final layer of an image restoration model 410 may also be a convolutional layer. Accordingly, an output image 402 may correspond to a degradation element (e.g., a high-frequency element) of the input image 401. The image processing apparatus may generate a restored image of the input image 401 by subtracting the output image 402 from the input image 401.

Different filter parameters may be stored and respectively associated with the filter kernels 420 that they represent, which may facilitate selection of different filter kernels for different tasks. For example, a filter parameter may include the type and characteristics of a corresponding filter. The characteristics of the filter may include a filtering factor, the size of the filter, and/or the like. The filter parameters of filter kernels may be set based on the operational characteristics of the first, second, and third layers 411, 412, and 413. For example, when each of the first, second, and third layers 411, 412, and 413 performs a convolution operation, a receptive field may gradually increase toward a following layer of the first, second, and third layers 411, 412, and 413. Accordingly, the filter parameter may be set such that a filter size may increase toward a following layer of the first, second, and third layers 411, 412, and 413. For example, when defining that the filter size (filter parameter) of the first filter kernel is k1, the filter size of the second filter kernel is k2, and the filter size of the third filter kernel is k3, the filter size may be k1<k2<k3. In this case, the filter size of filter parameters of the filter kernels 420 may affect another element (e.g., a filtering factor). For example, when the filter kernels 420 corresponds to a Gaussian filter, the filter size may be set to increase toward a following layer, and accordingly, a filtering factor (e.g., σ) of the filter kernels 420 may be changed (e.g., an increase of σ). As a result, a receptive field may gradually increase toward a following layer.

Figure 4B:
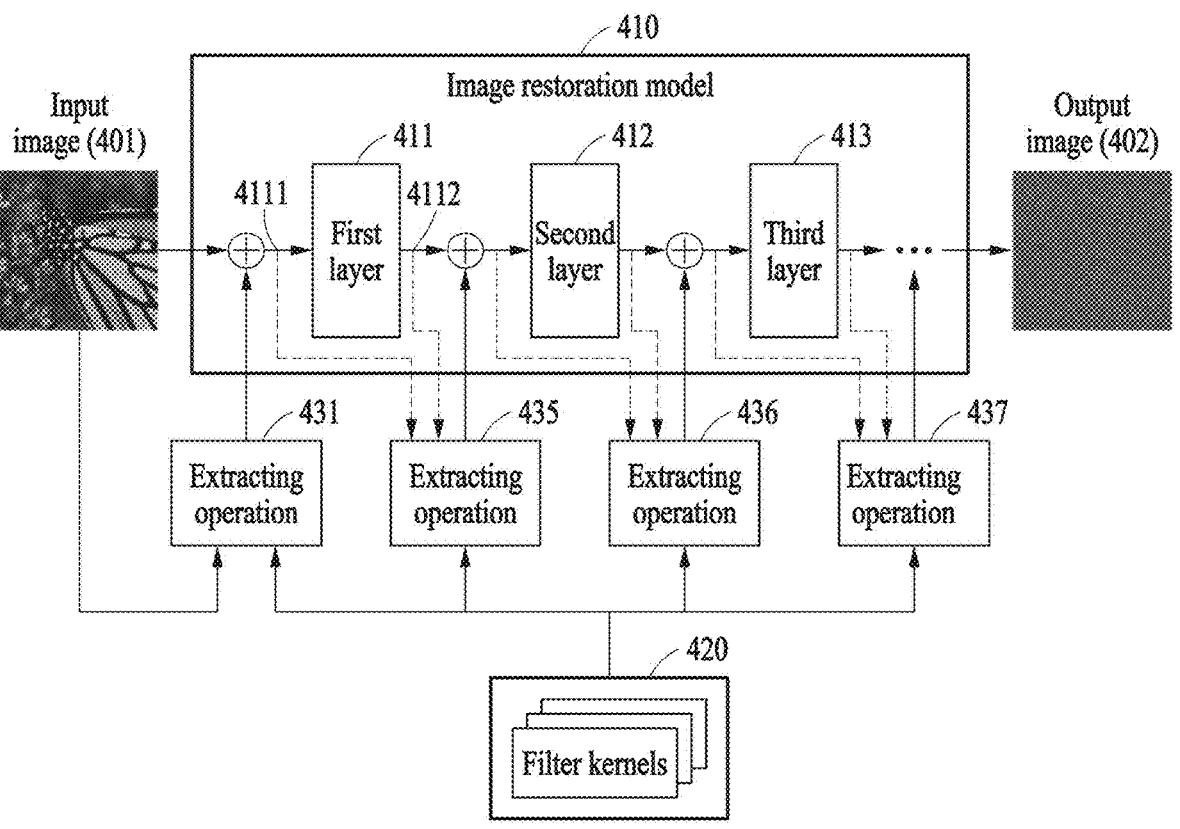
FIG. 4B illustrates an example of a network structure in which input data of a layer and/or output data of the layer is used as target data, according to one or more embodiments.
Figure 5:
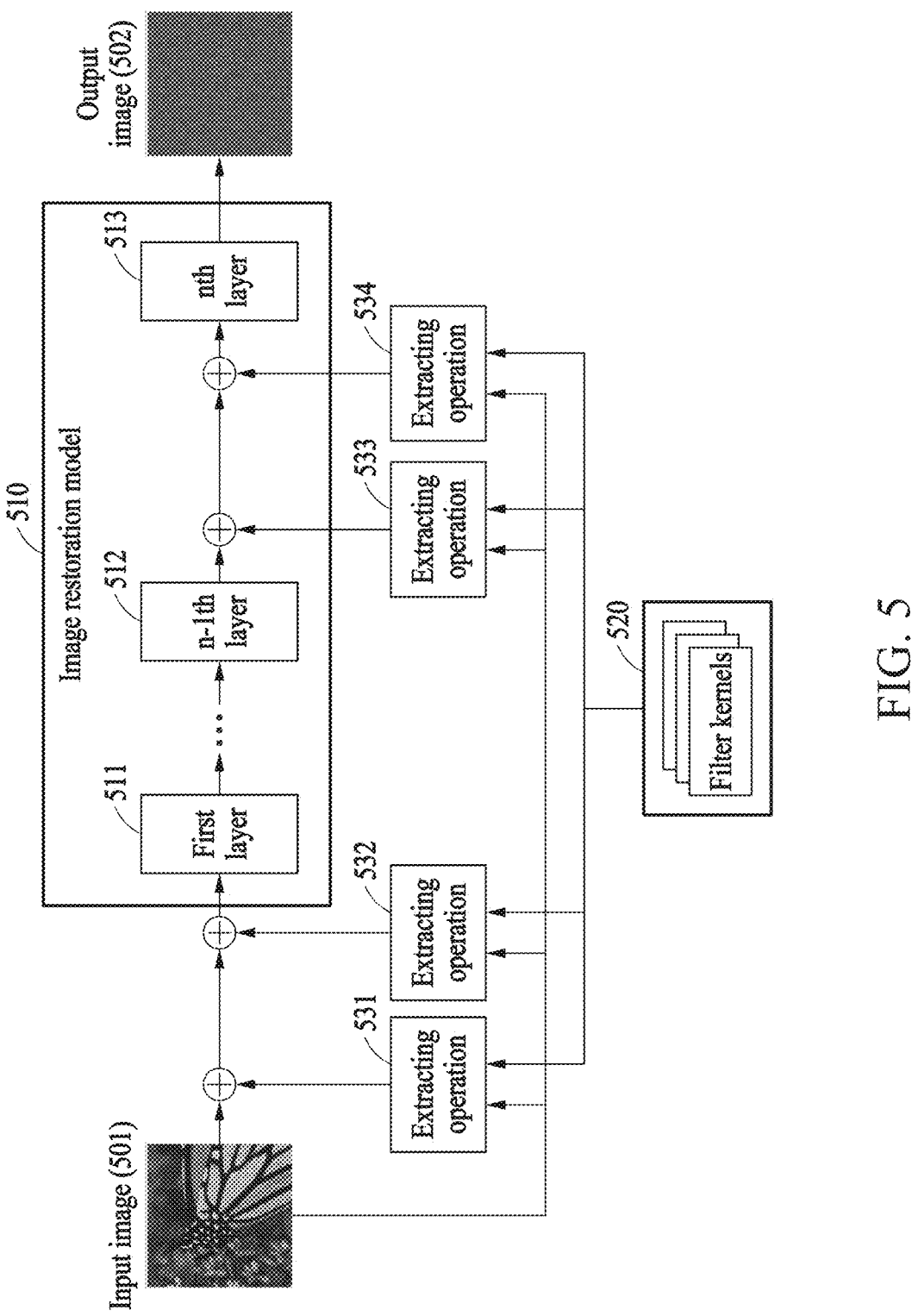
FIG. 5 illustrates an example of a network structure in which auxiliary data fuses with input data of an initial layer and a final layer, according to one or more embodiments.
Figure 6:
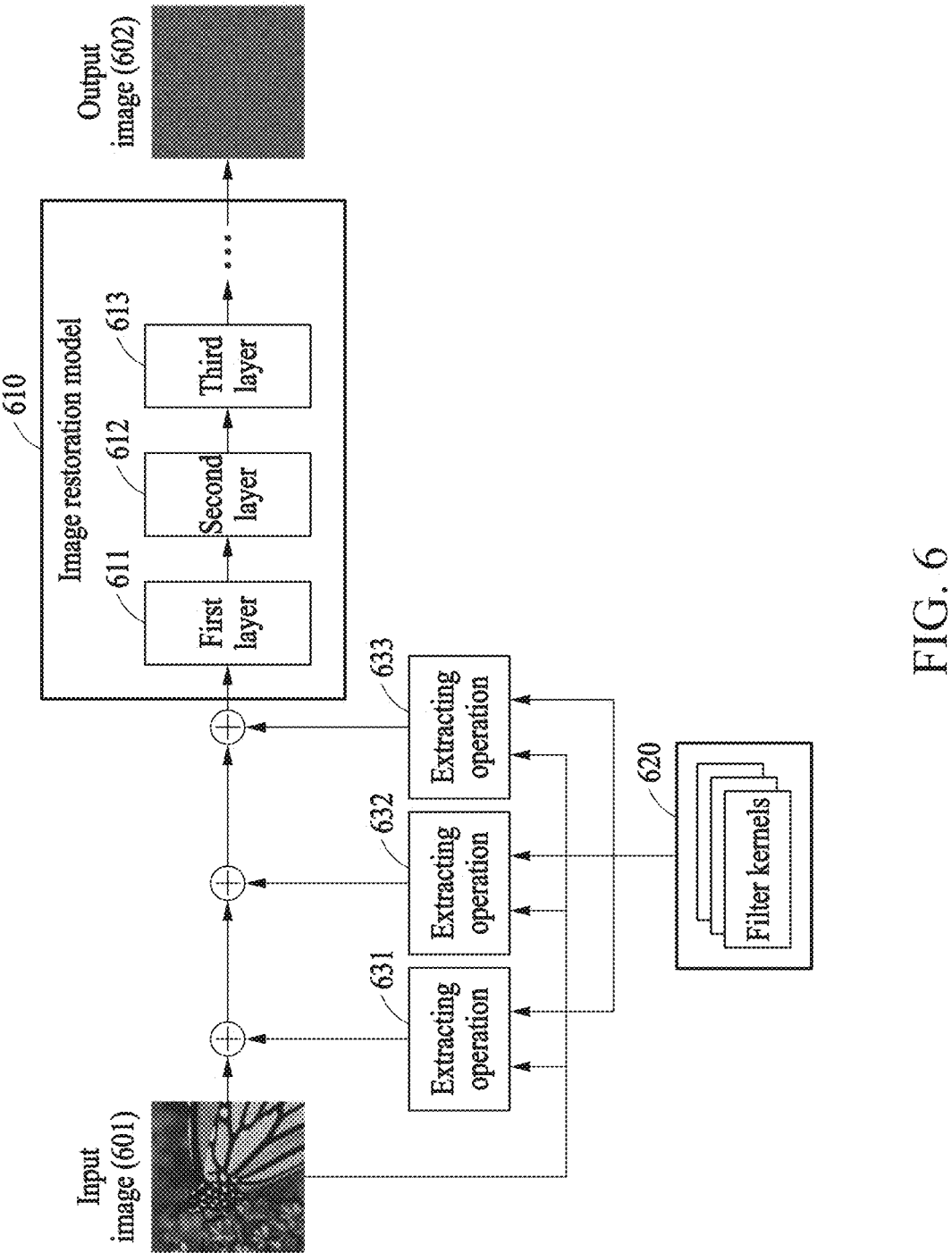
FIG. 6 illustrates an example of a network structure in which auxiliary data fuses with input data of an initial layer, according to one or more embodiments.

Although the examples of FIGS. 4A, 5, and 6 may use the input image 401 as filter kernel target data, other examples may use input data and/or output data of the first, second, and third layers 411, 412, and 413 of the image restoration model 410, instead of the input image 401, as the target data for the filter kernels. Such examples are described next with reference to FIG. 4B.

When the input image 401 is used as filter kernel target data, extracting operations 431, 432, and 433 may be parallelized. The image processing apparatus may perform the extracting operations 431, 432, and 433 in parallel and prepare auxiliary data for the first, second, and third layers 411, 412, and 413 and may use the prepared auxiliary data according to an execution sequence of the first, second, and third layers 411, 412, and 413. For example, when executing the third layer 413, the image processing apparatus may use prepared third auxiliary data to determine new third input data of the third layer 413. The term "prepared" means that auxiliary data (e.g., the third auxiliary data) of a current layer (e.g., the third layer 413) is prepared while (or before) the previous layer (e.g., the second layer 412) is being executed. Accordingly, the auxiliary data of the current layer may be readily available when an operation result of the previous layer is output, and thus, a time delay due to the generation of the auxiliary data may not occur.

FIG. 4B illustrates an example of a network structure in which input data of a layer and/or output data of the layer is used as target data. Referring to FIG. 4B, extracting operations 435, 436, and 437 may use input data and/or output data of first, second, and third layers 411, 412, and 413, other than an input image 401, as the target data. For example, for the extracting operation 435, an image processing apparatus may determine a second filtering result by filtering first input data 4111 of the first layer 411 with a second filter kernel of filter kernels 420 and may determine second auxiliary data by subtracting the second filtering result from the first input data 4111. The first input data 4111 may correspond to new first input data of the first layer 411 (see the description of "new" with reference to FIG. 2). The image processing apparatus may determine new second input data by fusing the second auxiliary data with second input data of the second layer 412. The second input data may correspond to output data 4112 of the first layer 411.

In another example, the image processing apparatus may determine the second filtering result by (i) filtering the output data 4112 of the first layer 411 with the second filter kernel or by (ii) filtering the input data 4111 and the output data 4112 of the first layer 411 with the second filter kernel. The extracting operations 436 and 437 may respectively use input data and/or output data of the second layer 412 and the third layer 413 as their respective target data.

When input data and/or output data are used as the target data, a sub-neural network may be used for the extracting operations 435, 436, and 437. For example, the sub-neural network of an extracting operation may include a convolutional layer (e.g., a 1*1 convolutional layer). The sub-neural network may decrease a channel dimension of the input data and/or the output data when it is used as target data for a filtering/extraction operation, and in the decreased channel dimension, a filtering/extraction operation by using the filter kernels 420 may be performed. The sub-neural network may decrease an operation quantity of the extracting operations 435, 436, and 437 and related subsequent operations.

FIG. 5 illustrates an example of a network structure in which auxiliary data (e.g., extracted with filter kernels) fuses (joins or combines) with input data of an initial layer and a final layer. Referring to FIG. 5, an image processing apparatus may determine first auxiliary data, based on an extracting operation 531 between an input image 501 and a first filter kernel of filter kernels 520. For example, the image processing apparatus may determine a first filtering result by filtering the input image 501 through the first filter kernel and determine the first auxiliary data by subtracting the first filtering result from the input image 501. The image processing apparatus may determine second auxiliary data, based on an extracting operation 532 between the input image 501 and a second filter kernel of the filter kernels 520.

The image processing apparatus may determine new first input data by fusing the first auxiliary data and the second auxiliary data with first input data of a first layer 511. When the first layer 511 is an initial layer of the image restoration model 510, the first input data of the first layer 511 may be the input image 501. For example, the image processing apparatus may concatenate the first auxiliary data and the second auxiliary data with the first input data in a channel dimension. When the number of channels of the first input data is c1, the number of channels of the new first input data may be c1 plus the number of channels of the first input data. For example, if the auxiliary data is black-and-white image data, then the number of channels of the new first input data may be c1+2 (1 channel for each the outputs of the extracting operations 531 and 532). If the auxiliar data is 3-channel color data, the number of channels of the new first input data may be c1+6 (3 channels for each of the outputs of the extracting operations 531 and 532). However, c1+2 and c1+6 are merely examples, and the number of channels is not limited thereto. The image processing apparatus may execute the first layer 511 by inputting the new first input data into the first layer 511. For example, the first layer 511 may be a convolutional layer (for example, when the image restoration model 501 includes a CNN).

The image processing apparatus may determine third auxiliary data by using the input image 501 and a third filter kernel of the filter kernels 520, may determine fourth auxiliary data by using the input image 501 and a fourth filter kernel of the filter kernels 520, may determine new nth input data by fusing the third auxiliary data and the fourth auxiliary data with nth input data of an nth layer 513, and may input the new nth input data to the nth layer 513. An n–1th layer 512 may include a convolutional layer and an activation layer, and the nth layer 513 may correspond to a convolutional layer. The image processing apparatus may generate a restored image of the input image 501 by subtracting an output image 502 from the input image 501 (as used herein "subtract" is operand-order agnostic; "subtracting" any two operands also means finding a difference between the two operands).

The filter kernels 520 may have different filter parameters (records of information about the filter kernels 520, stored, e.g., in memory and available before/during image restoration). For example, a filter parameter may include the type and characteristics of a correspondingly associated filter. The characteristics of the filter stored in the filter parameter (filter record) may include information about the associated filter kernel, for example a filtering factor, the size of the filter, and/or the like. The filter parameter(s) may be set based on the operational characteristics of the layers 511, 512, and 513. For example, a receptive field may gradually increase toward a following layer of the layers 511, 512, and 513 and the filter parameter may be set such that a filter size increases toward the following layer of the layers 511, 512, and 513. For example, when the filter sizes of first, second, third, and fourth filter kernels are respectively k1, k2, k3, and k4, the filter sizes may be $k1=k2<k3=k4$. In this case, a change in the filter size may affect an element (e.g., a filtering factor) other than the filter size among the filter parameters of the filter kernels 520.

Since, in the example of FIG. 5 at least (and possibly others), the input image 501 is used as the target data, extracting operations 531, 532, and 533 may be fully or partly parallelized (with respect each other and/or with respect to executions of model layers). Although two pieces of auxiliary data based on two respective extracting operations 531 and 532 fuse with input data of the first layer 511 and two pieces of auxiliary data based on two respective extracting operations 533 and 534 fuse with input data of the nth layer 513 in the examples described with reference to FIG. 5, one piece or three or more pieces of auxiliary data may fuse with pieces of input data of the first layer 511 and/or the nth layer 513. In addition, a different number of pieces of auxiliary data based on an extracting operation may be applied to the first layer 511 and the nth layer 513. For example, d1 pieces of auxiliary data may fuse with the input data of the first layer 511 and d2 pieces of auxiliary data may fuse with the input data of the nth layer 513. In this case, d1 and d2 may have different values.

FIG. 6 illustrates an example of a network structure in which auxiliary data fuses with input data of an initial layer. Referring to FIG. 6, an image processing apparatus may determine first auxiliary data, based on an extracting operation 631 between an input image 601 and a first filter kernel of filter kernels 620, may determine second auxiliary data, based on an extracting operation 632 between the input image 601 and a second filter kernel of the filter kernels 620, and may determine third auxiliary data, based on an extracting operation 633 between the input image 601 and a third filter kernel of the filter kernels 620.

The image processing apparatus may determine new first input data by fusing the first auxiliary data, the second auxiliary data, and the third auxiliary data with first input data of a first layer 611. When the first layer 611 is an initial layer, first input data of the first layer 611 may be the input image 601. For example, the image processing apparatus may concatenate the first auxiliary data, the second auxiliary data, and the third auxiliary data with the first input data in a channel direction. When the number of channels of the first input data is c1, the number of channels of the new first input data may be c1+3 or c1+9. c1+3 may represent black-and-white data and c1+9 may represent color data. However, c1+3 and c1+9 may just be examples, and the number of channels is not limited thereto. The image processing apparatus may execute the first layer 611 by inputting the new first input data into the first layer 611. For example, the first layer 611 may correspond to a convolutional layer. A second layer 612 and a third layer 613 may each include a respective convolutional layer and a respective activation layer (activation function). When an output image 602 is generated through the execution of the first, second, and third layers 611, 612, and 613, the image processing apparatus may generate a restored image of the input image 601 by subtracting the output image 602 from the input image 601. Although pieces of auxiliary data based on three extracting operations 631, 632, and 633 fuse with input data of the first layer 611 in the examples described with reference to FIG. 6, one, two, four, or more pieces of auxiliary data may fuse with the first layer 611.

Figure 7:
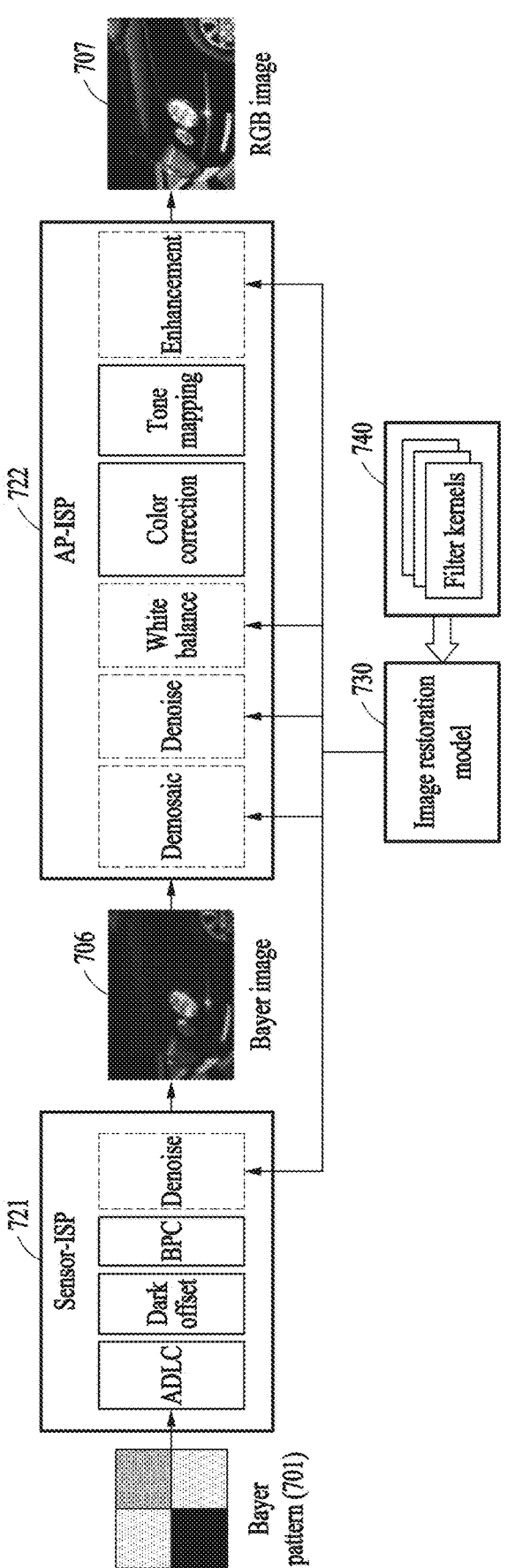
FIG. 7 illustrates examples of points at which an image restoration model may be applied in an image processing pipeline, according to one or more embodiments.

FIG. 7 illustrates examples of points at which an image restoration model may be applied in an image processing pipeline. In an example, an image restoration process using an image restoration model 730 and filter kernels 740 may be divided and processed by a sensor-image signal processing (ISP) unit 721 and an application processor (AP)-ISP 722 (the application processor may be a general-purpose processor, for example, a neural processor, or the like). For example, the image restoration process may include at least some of restoration tasks, such as denoising, demosaicing, white balancing, enhancement, and the like, and at least some of the restoration tasks may be divided and processed by the sensor-ISP 721 and the AP-ISP 722. For example, when the image restoration model 730 includes n layers and $n=m1+m2$, first m1 layers may be processed by the sensor-ISP 721 and next m2 layers may be processed by the AP-ISP 722. Although FIG. 7 illustrates that the AP-ISP 722 performs the restoration tasks, such as demosaicing, white balancing, and enhancement, at least some of the restoration tasks may be divided and processed by the sensor-ISP 721 and the AP-ISP 722.

For example, the sensor-ISP 721 may generate a Bayer image 706, based on sensor data according to a Bayer pattern 701, and the AP-ISP 722 may generate a red, green, and blue (RGB) image 707 based on the Bayer image 706. Although FIG. 7 illustrates an example of using the Bayer pattern 701, there may be other examples using different color filters, such as a Tetra pattern or a Nona pattern.

The image restoration model 730 may improve the quality of the RGB image 707 by improving the performance of the restoration tasks, such as denoising, demosaicing, white balancing, and enhancement. Combining the image restoration model 730 with the filter kernels 740 may allow a decreased number of layers of the image restoration model 730, may increase the speed of image restoration, and may decrease memory use. In addition, load balancing/sharing using the sensor-ISP 721 and the AP-ISP 722 may optimize the restoration tasks. Accordingly, the image processing apparatus 100 may be applied to low-power or real-time applications.

Figure 8:
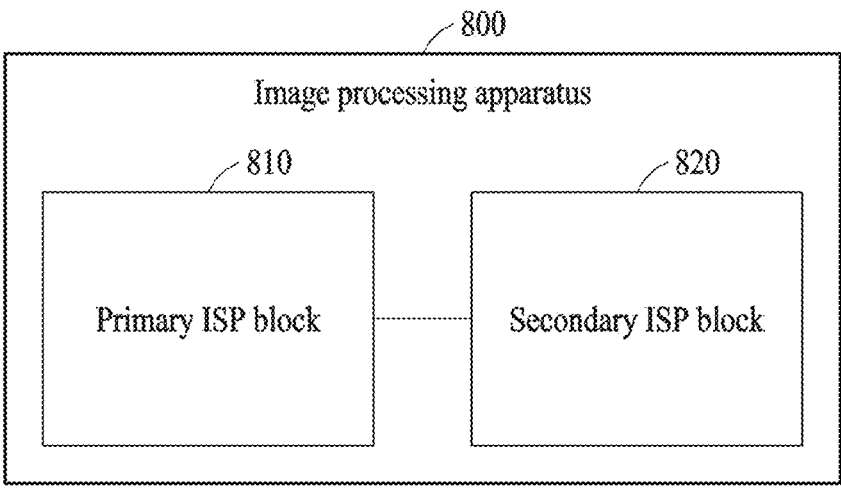
FIG. 8 illustrates an example configuration of an image processing apparatus, according to one or more embodiments.

FIG. 8 illustrates an example of a configuration of an image processing apparatus. Referring to FIG. 8, an image processing apparatus 800 may include a primary ISP block 810 and a secondary ISP block 820. The primary ISP block 810 and the secondary ISP block 820 may determine auxiliary data corresponding to a plurality of filter kernels by filtering target data with the plurality of filter kernels, may determine new input data by fusing the auxiliary data with at least some of input data of a plurality of layers of a neural network-based image restoration model, and may divide and perform an image restoration operation of generating, based on the new input data, a restored image of an input image by executing the neural network-based image restoration model. For example, the image processing apparatus 800 may execute a certain layer or some layers of an image restoration model specialized in a certain image restoration task by using the primary ISP block 810 and may execute the next layer or the other layers of the image restoration model by using the secondary ISP block 820. The primary ISP block 810 may correspond to the sensor-ISP 721 of FIG. 7 and the secondary ISP block 820 may correspond to the AP-ISP 722 of FIG. 7. In addition, the descriptions provided with reference to FIGS. 1 to 7 and 9 to 13 may be applied to the image processing apparatus 800. In some embodiments, the primary ISP block 810 and the second ISP block 820 are respective separate processors, which may each be configured for image signal processing.

Figure 9:
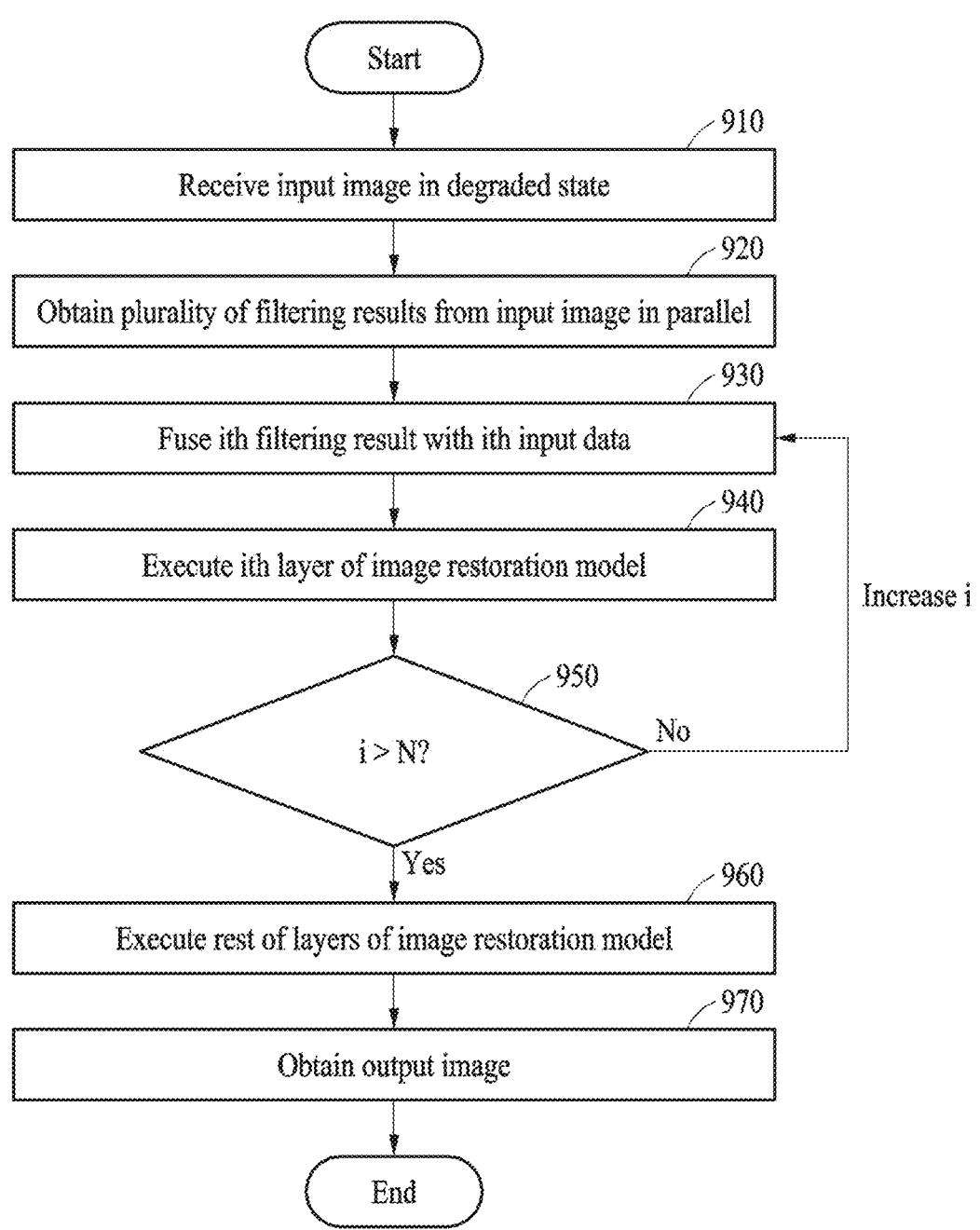
FIG. 9 illustrates an example of restoration by using a network structure in which auxiliary data fuses with input data of an initial layer and a final layer, according to one or more embodiments.

FIG. 9 illustrates an example of restoration by using a network structure in which auxiliary data fuses with input data of an initial layer and a final layer. Referring to FIG. 9, in operation 910 an image processing apparatus may receive an input image in a degraded state in operation 910, and in operation 920 the apparatus may obtain a plurality of filtering results from the input image in parallel. The image processing apparatus may fuse an ith filtering result with ith input data in operation 930 and may execute an ith layer of an image restoration model by using (as input to the ith layer) a fusion result in operation 940. In operation 950, the image processing apparatus may compare i with N, and when i is not greater than N, may increment i (increase i by 1) and then perform operations 930 and 940 again. N may be the number of filter kernels and the number of layers to which filtering result fusion is applied. When i is greater than N, the image processing apparatus may execute the rest of the layers of the image restoration model in operation 960 and may obtain an output image in operation 970. The restoration operation of FIG. 9 may correspond to the example of FIG. 4.

Figure 10:
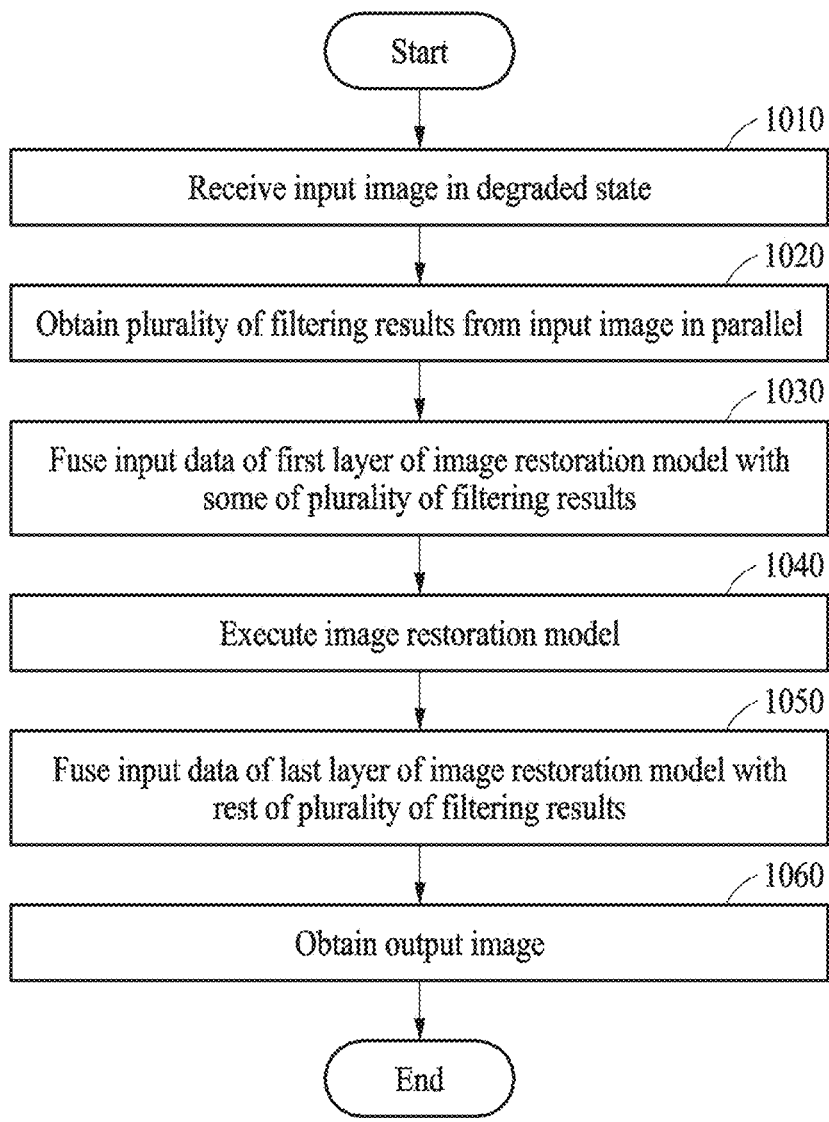
FIG. 10 illustrates an example of restoration by using a network structure in which auxiliary data fuses with input data of an initial layer and a final layer, according to one or more embodiments.

FIG. 10 illustrates an example of restoration by using a network structure in which auxiliary data fuses with input data of an initial layer and a final layer. Referring to FIG. 10, an image processing apparatus may receive an input image in a degraded state in operation 1010 and may obtain a plurality of filtering results from the input image in parallel in operation 1020. The image processing apparatus may fuse input data of a first layer of an image restoration model and some of the plurality of filtering results in operation 1030 and execute the image restoration model by using a fusion result in operation 1040. In this case, the last layer of the image restoration model may not be executed. In operation 1050, the image processing apparatus may fuse input data of the last layer of the image restoration model and the rest of the plurality of filtering results. The image processing apparatus may obtain an output image in operation 1060 as a result of executing the last layer of the image restoration model by using a fusion result. The restoration operation of FIG. 10 may correspond to the example of FIG. 5.

Figure 11:
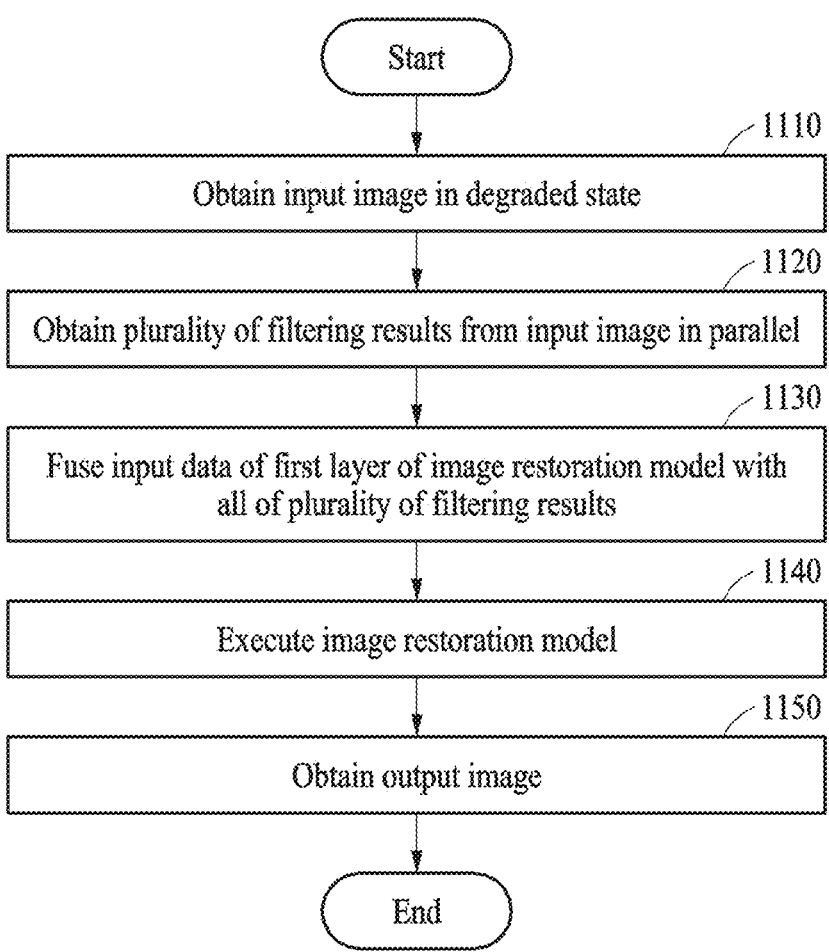
FIG. 11 illustrates an example of restoration by using a network structure in which auxiliary data fuses with input data of an initial layer, according to one or more embodiments.

FIG. 11 illustrates an example of restoration by using a network structure in which auxiliary data fuses with input data of an initial layer. Referring to FIG. 11, an image processing apparatus may receive an input image in a degraded state in operation 1110 and may obtain a plurality of filtering results from the input image in parallel in operation 1120. The image processing apparatus may fuse input data of a first layer of an image restoration model and all the plurality of filtering results in operation 1130 and may execute the image restoration model by using a fusion result in operation 1140. In operation 1150, the image processing apparatus may obtain an output image. The restoration operation of FIG. 11 may correspond to the example of FIG. 6.

Figure 12:
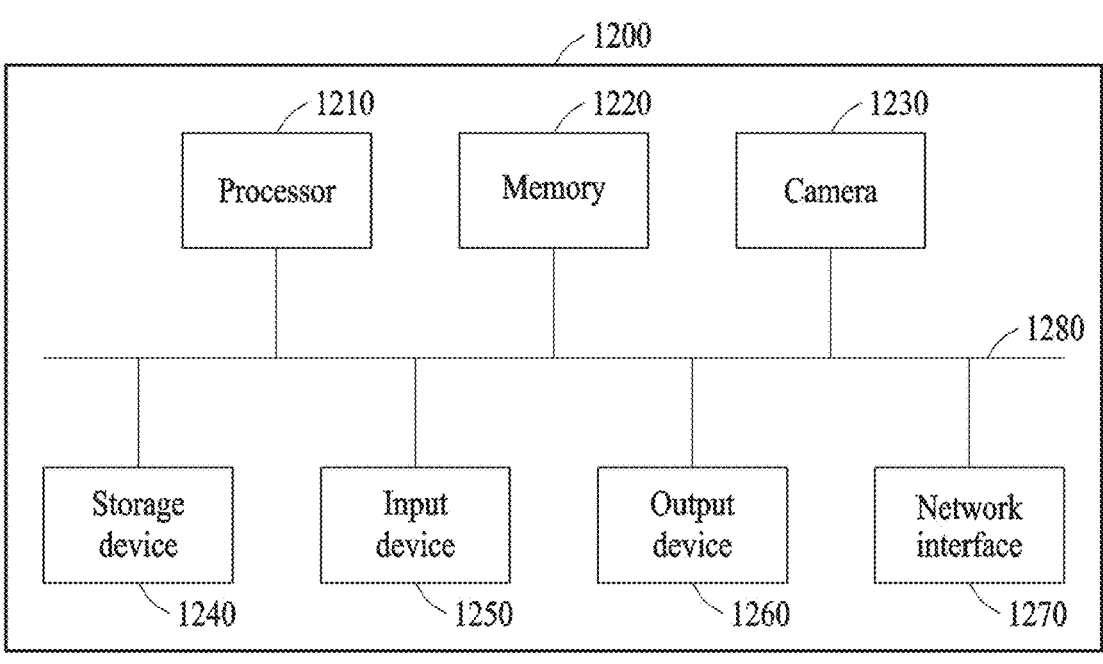
FIG. 12 illustrates an example configuration of an electronic device, according to one or more embodiments.

FIG. 12 illustrates an example configuration of an electronic device. Referring to FIG. 12, an electronic device 1200 may include a processor 1210, a memory 1220, a camera 1230, a storage device 1240, an input device 1250, an output device 1260, and a network interface 1270 that may communicate with each other through a communication bus 1280. For example, the electronic apparatus 1200 may be implemented as a mobile device such as a mobile phone, a smartphone, a personal digital assistant (PDA), a netbook, a tablet computer, a laptop computer, and the like, or a wearable device, such as a smart watch, a smart band, smart glasses, and the like, or a home appliance, such as a television (TV), a smart TV, a refrigerator, and the like, or a security device, such as a door lock and the like, or a vehicle, such as an autonomous vehicle, a smart vehicle, and the like, to name some examples. The electronic device 1200 may structurally and/or functionally include the image processing apparatus 100 of FIG. 1 and/or the image processing apparatus 800 of FIG. 8.

The processor 1210 may execute instructions and functions to be executed by the electronic device 1200. For example, the processor 1210 may process instructions stored in the memory 1220 or the storage device 1240. The processor 1210 may perform one or more of the operations described above with reference to FIGS. 1 to 11 and 13. The memory 1220 may include a computer-readable storage medium or a computer-readable storage device (which are not signals per se). The memory 1220 may store the instructions to be executed by the processor 1210 and may store related information while software and/or an application is executed by the electronic device 1200.

The camera 1230 may capture a photo and/or a video. A capturing result may correspond to an input image such as various input images discussed above. The storage device 1240 may include a computer-readable storage medium or a computer-readable storage device (which are not signals per se). The storage device 1240 may store a greater storage capacity than the memory 1220 and may store data in a non-volatile way. For example, the storage device 1240 may include a magnetic hard disk, an optical disc, a flash memory, a floppy disk, or other non-volatile memories.

The input device 1250 may receive an input from a user through a keyboard and a mouse, through a touch input, a voice input, an image input, or the like. For example, the input device 1250 may include a keyboard, a mouse, a touch screen, a microphone, or any other device for detecting the input from the user and transmitting the detected input to the electronic device 1200. The output device 1260 may render an output of the electronic device 1200 to the user through a visual, auditory, or haptic channel. The output device 1260 may include, for example, a display, a touch screen, a speaker, a vibration generator, or any other device that provides the output to the user. The network interface 1270 may communicate with an external device through a wired or wireless network.

Figure 13:
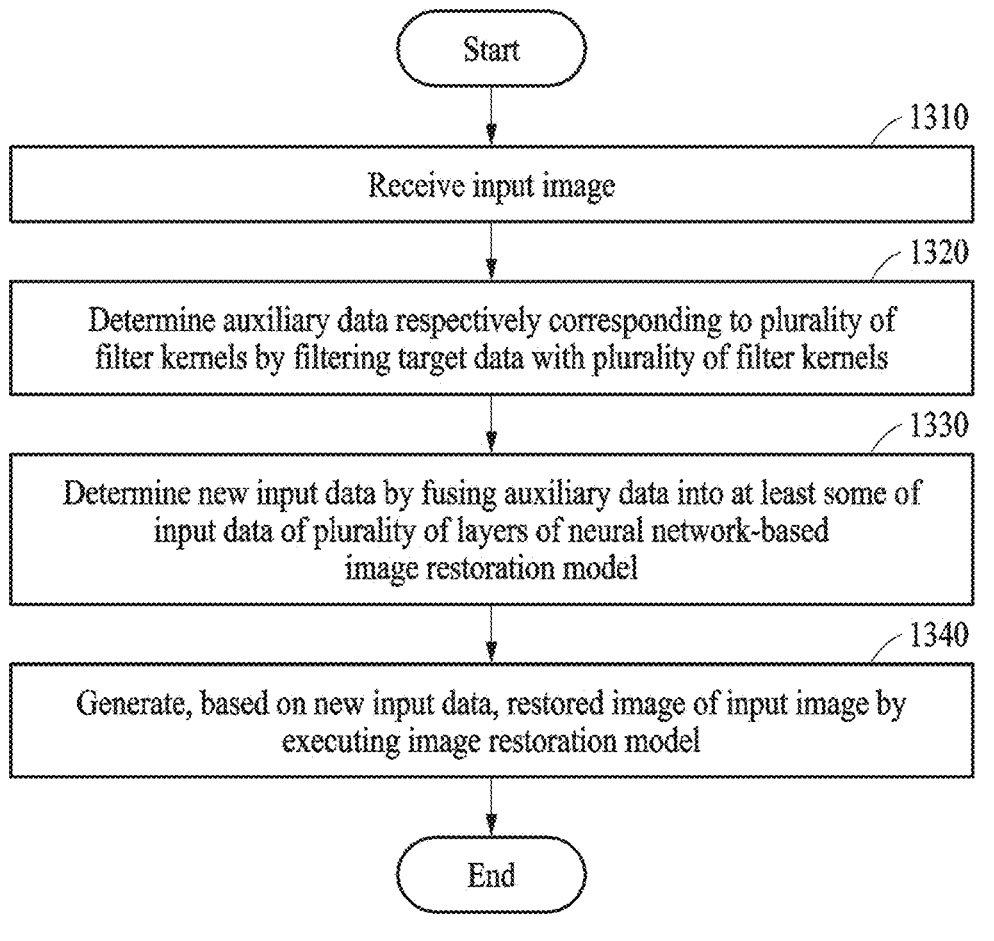
FIG. 13 illustrates an example image restoration method, according to one or more embodiments.

FIG. 13 illustrates an example of an image restoration method. Referring to FIG. 13, an image processing apparatus may receive an input image in operation 1310, may determine auxiliary data respectively corresponding to a plurality of filter kernels by filtering target data with the plurality of filter kernels in operation 1320, may determine new input data by fusing the auxiliary data with at least some of input data of a plurality of layers of a neural network-based image restoration model in operation 1330, and may generate, based on the new input data, a restored image of the input image by executing the neural network-based image restoration model in operation 1340.

The target data may include at least some of the input image, at least some of the input data of the plurality of layers, and at least some of output data of the plurality of layers. For example, the target data may be the input image, input data of a layer corresponding to a filter kernel, or input data of the previous layer of the layer corresponding to the filter kernel. The input data of the layer corresponding to the filter kernel may correspond to output data of the previous layer.

Operation 1320 may include determining first auxiliary data by filtering the target data with a first filter kernel of the plurality of filter kernels and determining second auxiliary data by filtering the target data with a second filter kernel of the plurality of filter kernels.

Operation 1330 may include determining new first input data by fusing the first auxiliary data with first input data of a first layer and determining new second input data by fusing the second auxiliary data with second input data of a second layer, in which the first layer corresponds to any one of the plurality of layers of the neural network-based image restoration model and the second layer corresponds to another one of the plurality of layers of the neural network-based image restoration model.

The first filter kernel and the second filter kernel may correspond to a Gaussian filter, the second layer may be closer to the output layer of the neural network-based image restoration model than the first layer, and the size of the second filter kernel may be greater than the size of the first filter kernel.

Operation 1330 may include determining the new first input data by fusing the first auxiliary data and the second auxiliary data with the first input data of the first layer corresponding to any one of the plurality of layers of the neural network-based image restoration model. For example, the first layer may correspond to an initial layer, an intermediate layer, or a final layer of the neural network-based image restoration model.

Determining the first auxiliary data and determining the second auxiliary data may be performed in parallel.

The target data may correspond to (or may be) the input image. Operation 1320 may include defining the plurality of filter kernels having different filter parameters from one another and determining auxiliary data, based on filtering results corresponding to the plurality of filter kernels by filtering the input image with the plurality of filter kernels in parallel. Operation 1340 may include generating, based on new input data according to the auxiliary data, a restored image by sequentially executing the plurality of layers of the neural network-based image restoration model.

The plurality of filter kernels may include the first filter kernel corresponding to a Gaussian filter for the first layer of the plurality of layers. Operation 1320 may include generating a first filtering result by filtering the target data with the first filter kernel and determining the first auxiliary data corresponding to a difference between the target data and the first filtering result. Operation 1330 may include determining the new first input data by concatenating the first auxiliary data with the first input data of the first layer.

Operation 1340 may generate the restored image, based on a difference between an output image of the neural network-based image restoration model and the input image.

Determining the auxiliary data or determining the new input data may be performed by a sensor-ISP, whichever of the two is not performed by the sensor-ISP may instead be performed by an AP-ISP. For example, operations related to certain layers of the neural network-based image restoration model may be performed by the sensor-ISP and operations related to the other layers of the neural network-based image restoration model may be performed by the AP-ISP. In other words, in some embodiments, some of the determining of the auxiliary data and the determining the new input data is performed by a sensor-ISP, and the rest of the determining of the auxiliary data and the determining the new input data is performed by the AP-ISP, and the division of computation between the AP-ISP and sensor-ISP can vary.

In addition, the descriptions provided with reference to FIGS. 1 to 12 may be applied to the image restoration method of FIG. 13.

The computing apparatuses, the vehicles, the electronic devices, the processors, the memories, the image sensors, the displays, the information output system and hardware, the storage devices, and other apparatuses, devices, units, modules, and components described herein with respect to FIGS. 1-13 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-13 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EE- PROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. An image restoration method comprising:
   convolving a first filter kernel, among a set of filter kernels, over first target data to generate a first filtering result, wherein the first target data includes first input data of layers of a neural network-based image restoration model, first auxiliary data for the first input data comprising or being derived from the first filtering result;
   determining new first input data by combining the first auxiliary data with at least some of the first input data; and
   generating, based on the new first input data, a restored image of an input image by inputting the new first input data to a first layer among layers of the neural network-based image restoration model, wherein the set of filter kernels are not part of any neural network,
   wherein the first input data comprises at least some of the input image or at least some of output data outputted by another of the layers.

2. The image restoration method of claim 1, further comprising
   determining second auxiliary data for output of the first layer according to the new first input data by convolving a second filter kernel among the set of filter kernels over second target data comprising the first input data and/or the output of the first layer.

3. The image restoration method of claim 2, further comprising determining the new first input data by combining the first auxiliary data with the first input data; and determining new second input data by combining the second auxiliary data with the output of the first layer according to the new first input data.

4. The image restoration method of claim 3, wherein the first filter kernel and the second filter kernel comprise Gaussian filters, the new second input data is inputted to a second layer of the layers that is closer to an output layer of the neural network-based image restoration model than the first layer, and a size of the second filter kernel is greater than a size of the first filter kernel.

5. The image restoration method of claim 2, further comprising:

determining the new first input data by combining the first auxiliary data and the second auxiliary data with the first input data.

6. The image restoration method of claim 2, wherein the determining the first auxiliary data and the determining the second auxiliary data are performed in parallel with respect to each other.

7. The image restoration method of claim 1, wherein the first target data is the input image, wherein the determining the first auxiliary data comprises:

selecting the set of filter kernels according to respective different filter parameters thereof; and determining the first auxiliary data and second auxiliary data for output of the first layer according to the new first input data by performing the convolving with the first and second filter kernels in parallel, and wherein the generating the restored image comprises:

sequentially executing the layers of the neural network-based image restoration model.

8. The image restoration method of claim 1, wherein the first filter kernel comprising a Gaussian filter for the first layer of the layers, the first auxiliary data comprises a difference between the first target data and the first filtering result, and wherein the determining the new input data comprises:

concatenating the first input data with the first auxiliary data.

9. The image restoration method of claim 1, wherein the generating the restored image comprises: generating the restored image based on a difference between an output image of the neural network-based image restoration model and the input image.

10. The image restoration method of claim 3, wherein the determining the first auxiliary data and the determining the first new input data is performed through image signal processing (ISP) of a sensor that captures the input image, and the determining the second auxiliary data and the determining the new second input data is performed through an ISP of an application processor (AP).

11. An electronic device comprising:

a camera configured to generate an input image;

one or more processors;

storage hardware storing instructions configured to, when executed by the one or more processors, cause the electronic device to:

receive the input image, convolve a first filter kernel, among a set of filter kernels, over first target data to generate a first filtering result, wherein the first target data includes first input data of layers of a neural network-based image restoration model, first auxiliary data for the first input data comprising or being derived from the first filtering result, determine new first input data by combining the first auxiliary data with at least some of the first input data, and generate, based on the new input data, a restored image of the input image by inputting the new first input data to a first layer among layers of the neural network-based image restoration model, wherein the set of filter kernels are not part of any neural network, wherein the first input data comprises at least some of the input image or at least some output data outputted by another of the layers.

12. The electronic device of claim 11, wherein the instructions are further configured to cause the electronic device to, to determine the auxiliary data:

determine second auxiliary data for output of the first layer according to the new first input data by convolving a second filter kernel among the set of filter kernels over second target data comprising the first input data and/or the output of the first layer.

13. The electronic device of claim 12, wherein the instructions are further configured to cause the electronic device to:

determine the new first input data by integrating the first auxiliary data with the first input data, and determine new second input data by integrating the second auxiliary data with the output of the first layer according to the new first input data.

14. The electronic device of claim 12, wherein the instructions are further configured to cause the electronic device to:

determine the new first input data by combining the first auxiliary data and the second auxiliary data with the first input data.

15. The electronic device of claim 12, wherein the instructions are further configured to cause the electronic device to determine the first auxiliary data and the second auxiliary data in parallel.

16. A method comprising processing an input image with an image restoration model comprising a convolutional neural network (CNN) that comprises a first convolution layer and a second convolution layer, the processing including the first convolution layer generating a first feature map as an output thereof;

filtering the input image with a filter kernel that is not part of any neural network to generate a first filtered image;

wherein the processing the image with the image restoration model includes providing both the first feature map and the first filtered image, or derivations thereof, as part of an input volume inputted to the second convolution layer; and generating a restored image corresponding to the input image based on an output of the second convolution layer processing the input volume.

17. The method of claim 16, wherein the generating the restored image comprises finding a difference between an output of the CNN and the input image, and wherein the output of the CNN is based on the output of the second convolution layer.

18. The method of claim 16, wherein providing the first filtered image increases a number of channels that are input to the second convolution layer.

* * * * *